United States Patent
Galamba et al.

(10) Patent No.: US 6,419,427 B1
(45) Date of Patent: Jul. 16, 2002

(54) ADJUSTABLE ROTARY TOOL PROVIDING A COUNTER BALANCED SYSTEM

(76) Inventors: Paul S Galamba, 2815 Highland Ridge Dr., Cumming, GA (US) 30041; Hosma D. Shumake, 1787 Orange Hill, Austell, GA (US) 30106

(*) Notice: Subject to any disclaimer, the term of this patent is extended or adjusted under 35 U.S.C. 154(b) by 0 days.

(21) Appl. No.: 09/708,351

(22) Filed: Nov. 8, 2000

Related U.S. Application Data

(60) Provisional application No. 60/164,172, filed on Nov. 9, 1999.

(51) Int. Cl.[7] .......................... B23B 35/00; B23B 51/00
(52) U.S. Cl. ..................... 409/131; 408/1 R; 408/238; 408/143; 409/141; 409/234
(58) Field of Search ................................ 409/131, 141, 409/232, 234; 74/573 R; 408/1 R, 143, 186, 238

(56) References Cited

U.S. PATENT DOCUMENTS

| | | | | |
|---|---|---|---|---|
| 3,180,187 A | | 4/1965 | McFerren ........................ 82/1 |
| 5,033,923 A | * | 7/1991 | Osawa ........................ 409/234 |
| 5,154,554 A | * | 10/1992 | Ariyoshi ..................... 408/143 |
| 5,263,995 A | * | 11/1993 | Mogilnicki et al. ......... 408/143 |
| 5,382,122 A | * | 1/1995 | Mihic ......................... 408/143 |
| 5,909,986 A | * | 6/1999 | Kaiser et al. ............... 408/143 |
| 6,053,678 A | * | 4/2000 | D'Andrea .................... 408/143 |

FOREIGN PATENT DOCUMENTS

| | | | | |
|---|---|---|---|---|
| DE | 2158717 A | * | 8/1973 | ................. 408/143 |
| SU | 872046 A | * | 10/1981 | ................. 408/143 |
| SU | 1096052 A | * | 6/1984 | ................. 409/141 |

* cited by examiner

*Primary Examiner*—Daniel W. Howell
(74) *Attorney, Agent, or Firm*—Joseph G. Mitchell

(57) ABSTRACT

The invention of this patent is an adjustable rotary tool counter balanced system. The invention provides for balancing weights that are mounted to a cutting tool body to provide a means to compensate for a rotational balance error induced by the variable positioning of a cutting tool. The invention allows a user to adjust the cutting tool within the cutting tool body, so as to maximize tool efficiency. The user can also balance the rotational mass about the axial center line of the cutter tool body, by means of the balancing weights, thus eliminating vibration caused by an unbalanced rotating cutting tool.

9 Claims, 1 Drawing Sheet

ADJUSTABLE ROTARY TOOL PROVIDING A COUNTER BALANCED SYSTEM

CROSS-REFERENCE TO RELATED APPLICATIONS

The Applicants filed a Provisional Patent Application for the invention in U.S. Ser. No. 60/164,172 on Nov. 9, 1999 and claim such Provisional Patent Application as an earlier filed application.

BACKGROUND OF THE INVENTION

1) Field of the Invention

The field of invention relates to an adjustable rotary tool providing a counter balanced system. More particularly, the invention provides for movable balancing weights that rotate about the axis of rotation of a cutting tool body to provide a means to compensate for a rotational balance error induced by the variable positioning of the cutting tool. The invention allows a user to adjust the cutting tool within the cutting tool body, so as to maximize tool efficiency, and maintain balance of rotational mass about the axial center line of the cutter tool body, thus eliminating vibration caused by unbalanced rotating masses.

2) Description of Prior Art

In the prior art, cutting and milling machines are known of the type that are fixed on a machine tool main spindle such that there is only one single position under which the center of gravity of the movable sliding element of the tool holder or cutter tool body and the cutting tool itself coincide with the rotating axis of the cutting and milling machine.

It is also known in the prior art that with the displacement of the tool holder or cutter tool body, the center of gravity of the tool holder or cutting tool body changes its balancing position, which is normally located over the rotating axis, leading to the unbalancing of the tool holder or cutter tool body. This unbalancing action increases even more as a cutting tool in the tool holder or cutting tool body is radially displaced to the outside in relation to the rotating axis.

Owing to the vibrations generated by the lack of balancing masses in the tool holder or cutting tool body, the harm caused to the precision and finishing of the cut during the cutting process have lead to the addition of balancing devices either inside or outside of the tool holder or cutting tool body.

For example, in U.S. Pat. Nos. 5,810,527 and 5,478,177, balancing rings are employed on the outside of the tool holder or cutting tool body to reduce the displacement of the rotary boring head. In U.S. Pat. No. 5,033,923, at least one balancing weight is placed within the orifices of the rotary tool for balancing the rotary tool.

Since the cut must be very precise and the rotation of the current tool holder or cutter tool body reaches extremely high levels, any unbalancing, even if only a small amount, leads to a non-quality cut, because in these cases very close tolerances are necessary.

In the prior art, an attempt has been made to overcome the unbalancing condition through the action of cylindrical rings or counterweights for mass displacement. However, it is a disadvantage that the known embodiments of such counterweights, along with the tool holder or cutter tool body, do not enable the rotary tool holder or cutter tool body to attain a high level of graduated balancing operation adequate for each situation, and does not provide for an adjustment to the rotary tool holder or cutter tool body.

SUMMARY OF THE INVENTION

In view of the foregoing disadvantages inherent in the known prior art, the present invention provides a cutter tool body that defines an interior passage which slideingly receives a cutting tool. The cutter tool body has adjustable means so as to accept different shapes and sizes of a cutting tool. On the outside of such cutter tool body is provided weights, which can be of different sizes, based on the angle and size of the cutting tool. The weights balance the rotary tool, such as a fly cutter or face mill tool or boring head, while such tool is in operation. As such, the general purpose of the present invention, which will be described subsequently in greater detail, is to provide a new and improved device which has all the advantages of the prior art and none of the disadvantages.

To attain this, the present invention provides a cutter tool body. The cutter tool body defines an interior passage for receiving a cutting tool. The cutting tool can slide within such interior passage of the cutter tool body. The cutting tool can be placed at different angles within the cutter tool body. The cutter tool body has a means of adjusting the interior passage's width so as to receive different size cutting tools. Such means consists of lock screws which can hold the cutting tool in place. Additionally, since the cutting tool may vibrate during operation, in to order resist such vibration and the results thereof, the cutter tool body has a means to receive weights which balance such cutting tool. The weights can be in different sizes and the preferred method is to use rectangular weights and mount such weights to both sides of the outer surface of the cutter tool body.

The invention resides not in any one of these features per se, but rather in the particular combination of all of them herein disclosed and claimed, and it is distinguished from the prior art in this particular combination of all its structures for the functions specified.

There has thus been outlined, rather broadly, the important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved device which has all of the advantages of the prior art and none of the disadvantages.

It is another object of the present invention to provide a new and improved device which may easily receive cutting tools so as to efficiently manufacture products.

It is a further object of the present invention to promote a new and improved device which can receive different size cutting tools.

It is a further object of the present invention to promote a new and improved device which provides a better and more reliable method to counteract vibrations caused when the tool is in operation.

It is a further object of the present invention to promote a new and improved device which provides an easy method to set-up and use.

An even further object of the present invention is to provide a new and improved device which is susceptible of a low cost of manufacture with regard to both materials and labor, and which accordingly is then susceptible of low prices of sale to the consuming public, thereby making such device economically available to the buying public.

Still yet another object of the present invention is to provide a new and improved device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its use, reference should be had to accompanying drawings and descriptive matter which there is illustrated preferred embodiments of the invention.

BRIEF DESCRIPTION OF THE DRAWINGS

The invention will be better understood based on the following detailed description. Such description makes reference to the annexed drawing wherein.

DESCRIPTION OF THE PREFERRED EMBODIMENT

Figure 1:
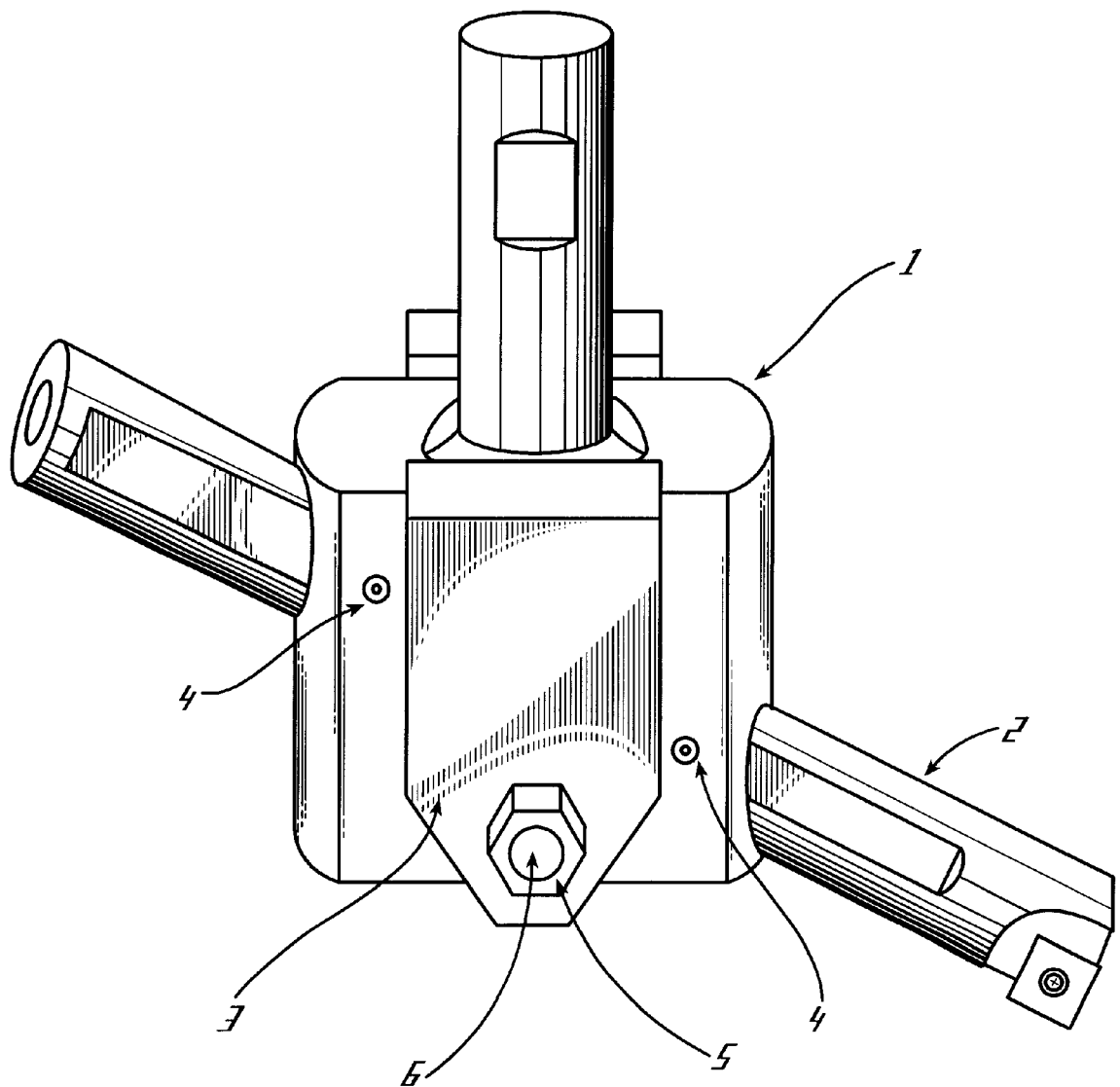
FIG. 1 shows an isometric view of the invention.

With reference now to the drawings, and in particular FIG. 1, the adjustable rotary tool providing a counter balanced system which embodies the principles and concepts of the present invention.

With reference to FIG. 1, FIG. 1 depicts an isometric view of the present invention. It comprises the cutter tool body 1 with a passage therein for receiving a cutting tool 2. Lock screws 4 which pass through the cutter tool body 1 and engage the cutting tool 2. The lock screws 4 allow for adjustment within the cutting tool body 1 such that said cutting tool 2 can be positioned either closer or further from the center of rotation of the cutter tool body 1 to change the effective cutting diameter. A balancing weight 3 is connected to each side of the cutter tool body 1 by means of placing the balancing weights 3 of either end of a threaded rod 6 and using a nuts5 to attach the balancing weights 3. The balancing weights 3 provide a means to balance the cutting tool 2. As the cutter tool body 1, balancing weights 3, and cutting tool 2 rotate as a unit, the balancing weights 3 balance mass displacement caused by the cutting tool's 2 position, and can be exchanged with different size weights (based on the cutting tool's 2 position) so as to balance the cutter tool body 1 as it rotates.

The invention operates as follows: (1) The operator of the invention positions the cutting tool 2 within the cutter tool body 1 by means of the lock screws 4; (2) Based on the position of the cutting tool 2, the operator selects the proper size balancing weights 3 and positions such balancing weights 3 on both sides of the cutter tool body 1 by means of a threaded rod 6 that passes through the cutter tool body 1; (3) The operator then attaches such balancing weights 3 onto the threaded rod 6 means of nuts 5; (4) The balancing weights 3 should be chosen and adjusted by the operator so as to compensate for the rotational balance error that occurs based on the variable position of the cutting tool 2; then, (5) The operator then cuts the article.

With respect to the above description then, it is to be realized that the optimum dimensional relationships for the invention to include variations in size, materials, shape, form, function and manner of operation, assembly and use, are deemed readily apparent and obvious to one skilled in the art, and all equivalent relationships to those skilled in the art, and all equivalent relationships to those illustrated in the drawings and described in the specification are intended to be encompassed by the present invention.

Thus, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable rotary tool providing a counter balanced system, comprising:
   a cutting tool body;
   a first counterweight which is not in the form of a ring;
   a second counterweight which is not in the form of a ring;
   a first means for attaching said first counterweight to the outer surface of said cutting tool body;
   a second means for attaching said second counterweight to the opposite side of the outer surface of said cutting tool body; and
   a means for connecting a cutting tool within said cutting tool body.

2. The device of claim 1, wherein said first counterweight is in the shape of a rectangular mass.

3. The device of claim 1, wherein said second counterweight is in the shape of a rectangular mass.

4. The device of claim 1, wherein said first means for attaching includes:

a first nut; and a threaded rod through said cutting tool body.

5. The device of claim 4, wherein said second means for attaching includes a second nut and said threaded rod.

6. The device of claim 1, wherein said means for connecting is at least one lock screw.

7. The device of claim 6, wherein said cutting tool has an interior passage therein for receiving a cutting tool and said interior passage's width may be adjusted by means of said lock screw.

8. An adjustable rotary tool providing a balanced system, comprising:

a cutting tool body having an interior passage therein for receiving a cutting tool;

a first counterweight which is not in the form of a ring and in the shape of a rectangular mass;

a second counterweight which is not in the form of a ring and in the shape of a rectangular mass;

a threaded rod through said cutting tool body;

a first nut attached to said threaded rod which connects said first counterweight to the outer surface of said cutting tool body;

a second nut attached to said threaded rod which connects said second counterweight to the opposite side of the outer surface of said cutting tool body; and at least one lock screw for connecting a cutting tool within said cutting tool body.

9. A method of balancing a rotary tool, which comprises the steps of:

placing a cutting tool within a cutting tool body;

securing said cutting tool within said cutting tool body by means of at least one lock screw;

mounting counter weights, said counter weights not being in the shape of a ring, to each side of said cutting tool body by means of a threaded rod which passes through said cutting tool body; and securing said counter weights to said cutting tool body by means of a nut.

* * * * *